United States Patent

Retter et al.

[11] Patent Number: 5,995,157
[45] Date of Patent: Nov. 30, 1999

[54] SYNC SIGNAL SEPARATOR APPARATUS

[75] Inventors: Rafi Retter; Yonatan Manor, both of Haifa; David Bar, Carmiel, all of Israel

[73] Assignee: Oren Semiconductor Ltd., Yoqne'am Illit, Israel

[21] Appl. No.: 09/016,943

[22] Filed: Feb. 2, 1998

[30] Foreign Application Priority Data

Feb. 4, 1997 [IL] Israel ......................................... 120145

[51] Int. Cl.[6] ................................................. H04N 5/04
[52] U.S. Cl. ............................................. 348/525; 348/465
[58] Field of Search ...................................... 348/464, 465, 348/510, 500, 521, 525, 529, 530, 532, 533, 725; 358/153, 148, 154, 155, 150, 147; H04N 5/08, 5/04, 5/06

[56] References Cited

U.S. PATENT DOCUMENTS

| | | | |
|---|---|---|---|
| 4,170,026 | 10/1979 | Nagaoka et al. | 348/725 |
| 4,654,708 | 3/1987 | De La Guardia | 348/510 |

Primary Examiner—David E. Harvey
Attorney, Agent, or Firm—Oliff & Berridge, PLC

[57] ABSTRACT

In a composite video signal that contains an image field having vertical synchronization (V_Sync) pulses, The V_sync pulses include first equalization pulses of $E_1$ waveforms followed by a serration pulses of S waveforms, $T_S$-long each, followed by a second equalization pulse of $E_2$ waveforms, $T_E$-long each. The transition from a last waveform of the $E_1$ waveforms to a first waveform of the S waveforms constitutes a vertical synchronization (V_sync) signal. The system a reference event occurring at a first time interval $\Delta T_1 \pm Er$ after said V_sync signal, wherein Er stands for time shift error. The system includes filter for filtering the composite video signal so as to obtain a filtered signal. Clamper for clamping the filtered signal so as to obtain a clamped signal. First detector for detecting N ($N \leq S$) waveforms in the serration pulses thereby indicating first event occurrence. Second detector for detecting M ($M \leq E_2$) waveforms in the second equalization pulses, thereby determining the reference event occurrence, such that the $\Delta T_1$ equals $M^*T_E + S^*T_S$.

23 Claims, 6 Drawing Sheets

SYNC SIGNAL SEPARATOR APPARATUS

FIELD OF THE INVENTION

The present invention is in the field of detecting synchronization signals in a composite video signal of TV broadcasts for use, e.g. in ghost cancellation applications.

GLOSSARY

There follows a Glossary of terms used throughout the specification, some of which are conventional and others having been coined:

Composite Video Signal—(referred to also as TV signal) is composed of a series of TV lines signals that are concatenated into a continuous signal. A TV signal includes a video data constituent, color constituent, synchronization signals and others, all depending on the specific standard e.g. NTSC, PAL/SECAM.

Image field—X lines in a TV signal constitute a TV field that is displayed from the top to the bottom of the screen. A TV signal, indicative of a TV scene, consists of a succession of image fields each presorting a still image on the screen. In NTSC standard, X stands for 362 or 363 and in PAL/SECAM standard X stands for 312 or 313.

Vertical Synchronization (V_Sync) pulses (in a field image)—A pulses consisting of first equalization pulses of high-duty-cycle waveforms followed by a serration pulses of low-duty-cycle waveforms followed by a second equalization pulses of high-duty-cycle waveforms.

V_Sync waveform—is a single waveform in the V_sync pulses having high level amplitude (blank level) and low level amplitude (sync level); the V_sync waveform may fall in either one of the first equalization pulses (constituting a first equalization waveform), second equalization pulses (constituting a second equalization waveform) or the serration pulses (constituting a serration waveform); the V_sync equalization waveform (either first or second) is characterized by having high duty cycle (e.g. 93% in the NTSC standard, whereas the V_sync serration waveform is characterized by having a low duty cycle (e.g. 7% in the NTSC standard. For example, in the NTSC standard there are 6 waveforms in the first equalization pulses, 6 waveforms in the serration pulses and 5 or 6 waveforms in the second equalization pulses.

V_sync signal—is defined as the transition from the blank level of the last waveform in the first equalization pulses to the sync level of the first waveform in the serration pulses.

Horizontal (H_sync) signal—a unique signal that separates successive lines. Each line is preceded by the H_sync signal. According to e.g. the NTSC standard the H_sync signal consists of a single waveform that drops from high blank level amplitude to a low sync level amplitude.

BACKGROUND OF THE INVENTION

For a better understanding of the invention, it is exemplified with respect to a non-limiting, ghost cancellation application. The invention is, by no means, bound by this specific application.

The motivation for developing a system of the invention arises, inter alia, from the development of ghost cancellation technology for TV broadcast reception. Reception of terrestrial TV broadcasts often suffers from many types of interference. These interferences can appear on the TV screen in various forms such as noise ("snow"), ghosts and others. One of the most annoying types of interference is the presence of "ghosts" in a TV image. A "ghost" is actually a lower intensity duplicate of the main image, shifted horizontally relative to the main image. These "ghosts" are created by reflections of the broadcast TV signal from large objects such as mountains and buildings. The reflections of the main signal appear at the TV antenna as delayed or preceded and attenuated duplicates of the main signal. When the TV antenna receives the reflections together with the main broadcast signal they are displayed on the TV screen as "ghosts".

The interference caused by ghosts not only annoys the viewer but also degrades the correct operation of the TV circuits. To facilitate the operation of the TV, synchronization signals are transmitted together with the video signal. Reflections that cause ghosts not only distort the image, but also distort the synchronization signals, thus disrupting the normal operation of the TV.

Until recently, the interference of strong ghosts could not be avoided or corrected. The interference due to ghosts adversely affects the quality of the displayed image on the screen because of the multiple images, or because of the failure of the TV circuits to detect correctly the synchronization signals. Digital ghost cancellation systems developed in recent years can resolve the visible effects of the ghosts and restore the image to its original form. Although these ghost cancellation systems eliminate the ghosts and clear the image, their correct operation depends upon the detection of the synchronization signals, e.g. for a given ghost cancellation application an accurate detection of the horizontal synchronization signal of a predetermined line number is necessary. Failure to detect the latter adversely affects the performance of the ghost cancellation application.

It is thus vital for any ghost cancellation system to detect in a high level of certainty the synchronization signals in the received signal despite the distortions.

There follows a brief description of a TV signal pulses (referred to also as "video composite signal") with emphasis on the horizontal (H_sync) and virtual (V_sync) synchronization signal constituents, and a brief description as to how the hitherto known H_sync and V_sync separator operates.

Thus, as is well known, TV signal is normally composed of a series of TV lines concatenated into a continuous signal. The TV separates the continuous signal into separate lines and displays the lines one after another from the top to the bottom of the screen. N lines constitute an image field. At the beginning of every new field, the next line is displayed at the top of the TV screen thereby starting a new image.

A new line is determined according to the horizontal sync, which is a unique signal pulses that separates successive lines. The TV determines the beginning of a new field according to the vertical synchronization signal, V_sync, which is a unique signal pulses that separates consecutive fields. The composite video signal is composed of the data constituent together with the H_sync, V_sync as well as color synchronization constituents. The TV circuit should correctly detect the V_sync in the composite video in order to reconstruct the TV image field, and to route it to the screen.

Figure 1:
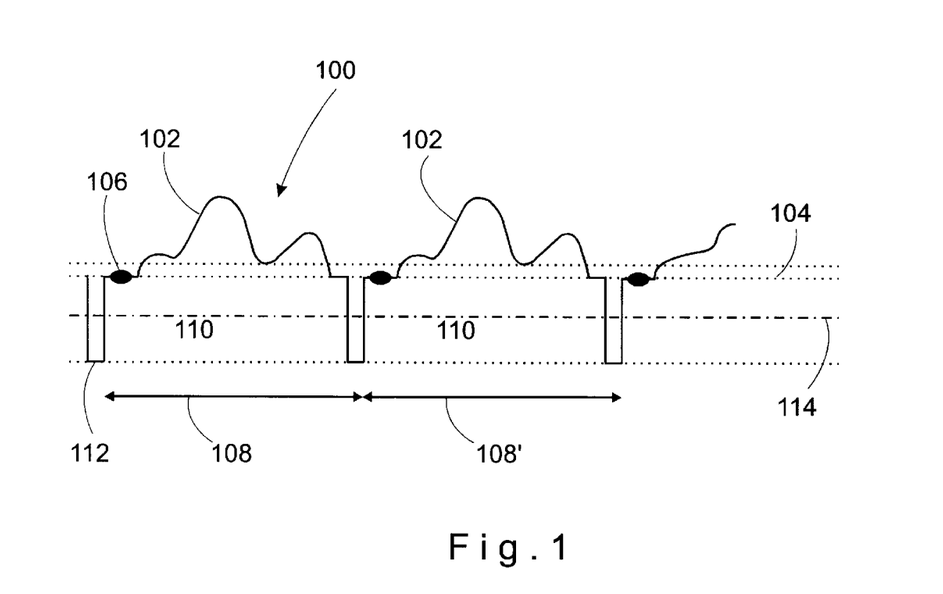
FIG. 1 depicts a typical composite video signal portion.

For a better understanding of an H_sync sync detection sequence, attention is directed to FIG. 1 which illustrates a composite video signal portion (100) having visible video data constituent (102) that surpasses a blank level (104). As shown, the video signal has an associating color burst constituent (106) for synchronizing the color carrier demodulation.

As shown, the video signal portion (100) includes data of two video lines (108) and (108'), respectively to be displayed on the TV monitor.

Each video line is identified by an H_sync signal (110) having a sync level amplitude (112) that drops below the blank levels (104).

As is clearly shown in FIG. 1, the H_sync waveform (110) always drops below the blank level while the video signal level (102) always surpasses the blank level. Any time the TV detects a transition of the amplitude below a certain threshold, an H_sync is detected. The thresh-old (114) is usually half way between the blank level (104) and the sync level (112) amplitudes. Normally, in order to minimize interference by noise, the composite video signal is first passed through a low pass filter that attenuates the noise and thereafter an edge detection circuit detects the negative transition of the filtered composite video from above, to below the threshold.

Figure 2:
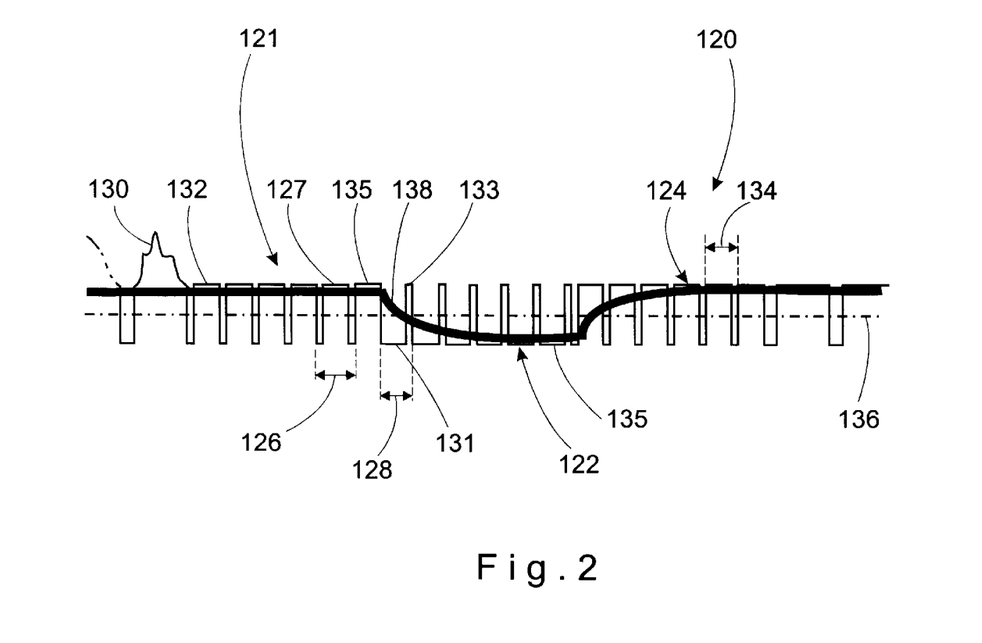
FIG. 2 is a graph representation of vertical signal detection according to prior art.

The conventional, hitherto known techniques for detecting V_sync signal in a composite video signal will now be described with reference to FIG. 2.

Thus, vertical synchronization (V_sync) pulses (120) is composed of a first equalization pulses (121) followed by a serration pulses (122) which in turn is followed by a second equalization pulses (124). The first equalization pulses (121) consists of 6 (NTSC) or 5 (PAL/SECAM) waveform half a TV line length each (e.g. waveform (126). The serration pulses (122) consists of 6 (NTSC) or 5 (PAL/SECAM) waveforms half a TV line length each, e.g. (128). The second equalization pulses (124) consists of 5 or 6 for odd or even, respectively (NTSC) or 4 or 5 for odd or even, respectively (PAL/SECAM) waveforms half a TV line long each, e.g. (134). As is well known, the pulses of the first and second equalization series is of a flat signal at the blank level, in which one negative pulse is inserted for each half line. The waveform of the equalization pulses is formed by dropping the signal amplitude from the blank level to the sync level (e.g. from (127) to (129) in pulse (126). The waveform of the serration pulses is a flat signal at the sync amplitude level in which one positive pulse is inserted for each half line. The waveform of the serration pulses is formed by raising the signal from the sync level to the blank level (e.g. from (131) to (133) in waveform (128)). The V_sync signal is defined as the negative transition of the composite video signal from the blank level (135) to the sync level (128) at the transition between the last waveform of the first equalization pulses to the first serration waveform in the serration series.

According to hitherto known techniques, e.g. in conventional analog TV circuitry, the V_sync signal is usually detected by an analog or digital integrator that operates on the composite video signal. During the video portion (130) and the first equalization pulses (121) of the composite video signal surpasses most of the time a so-called vertical threshold level (136) (determined usually to be halfway between the blank and the sync levels) and accordingly, it acquires a positive value. During the serration pulses the integrated signal resides, most of the time below the specified threshold (136) and accordingly, the integrator acquires a negative value. The resulting positive and negative integrator values are manifested by the integrated signal having a positive value (132) and a negative value (135). The falling of the integrated signal level below the threshold (136) triggers a V_sync detection event. According to the prior art the occurrence and the timing of the V_sync signal are indicated simultaneously. The time constant of the integrator signal is adjusted to be long enough so as not to allow the integrator value to change much during the first equalization pulses, or the serration pulses thereby attenuating noise interferences. The relatively long integrator time constant, whilst attenuating the noise constituent has an intrinsic shortcoming in that the indication of the V_sync signal is delayed as compared to the actual occurrence of the V_sync signal. Thus, where the V_sync signal occurs at the transition from the blank level (135) to the sync level (131), the actual V_sync detection event occurs only afterwards when the integrated signal (135) crossed the threshold level (136) at point (138). Whereas precise detection of the V_sync signal timing is not obligatory for the control of the TV display, failing to detect the delayed V_sync event within a specified tolerance could result in distorted image on the TV monitor. As will be evident from the description below, the underlying premise that the respective blank level and sync level of the equalization and serration pulses are distinguishable one with respect to the other blurs under noisy conditions, (e.g. appearance of ghost) thereby rendering the specified integration technique error prone.

Figure 3:
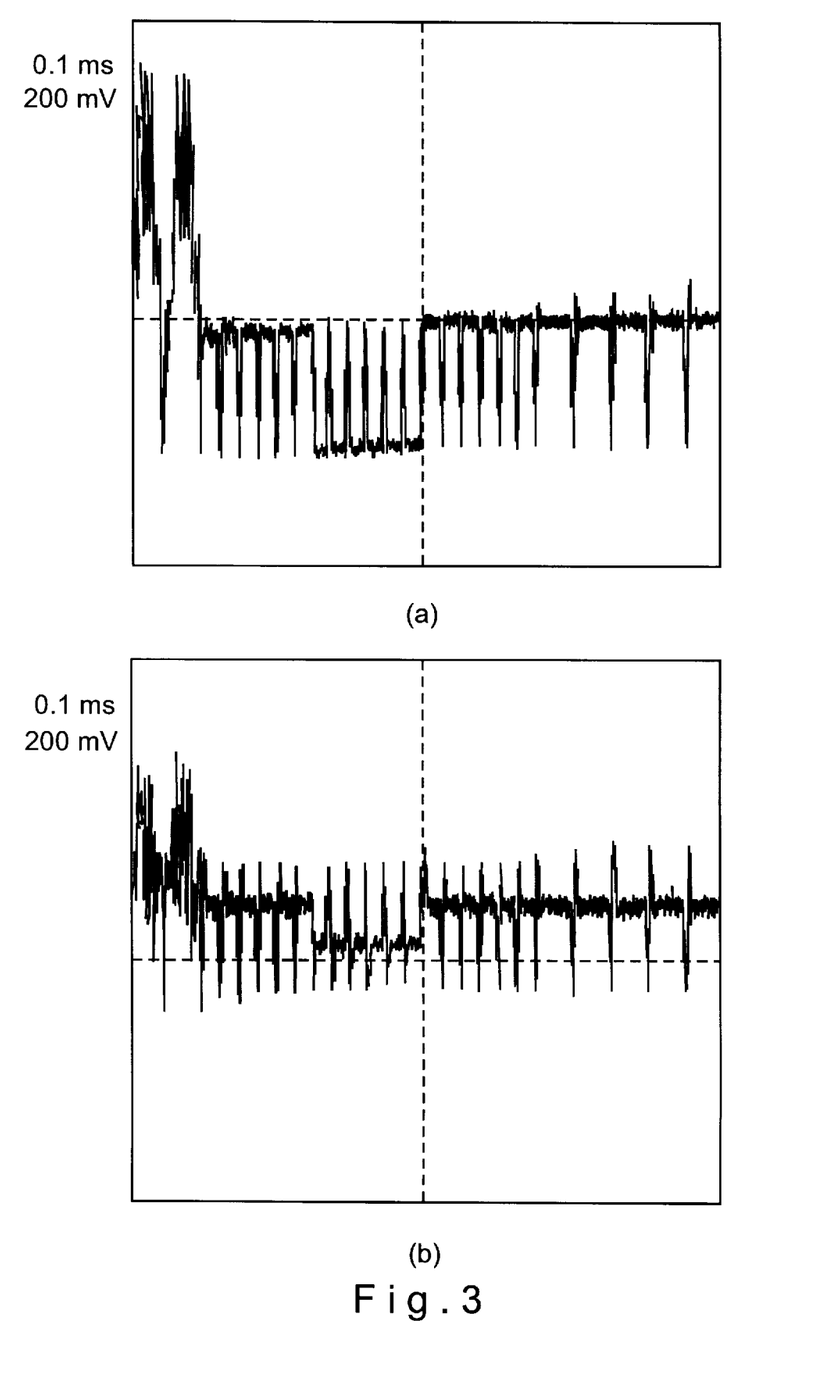
FIGS. 3a–b are two graph representations of respective ghost free and ghost contained vertical synchronization pulses.

Thus, ghosts can alter the shape of the composite video signal in the V_sync pulses such that normal detection of the V_sync by the commonly used technique does not guarantee reliable detection. FIGS. 3(a)–3(b) present an example of the effects of a negative ghost on the equalization and serration pulses. Thus, FIG. 3(a) depicts equalization and serration pulses ((140) and (142), respectively) in a ghost free composite video signal. Conversely, and as is shown in FIG. 3(b), in a ghostly environment, the ghost duplicates the pulses and reduces the amplitude difference between the blank level and the sync level (144,146), vis-a-vis, the respective signals in the counterpart equalization and serration pulses (140,142). The blurring of the blank and sync level as shown in FIG. 3(b), results in slowing down the rate of attenuation of the integrated signal (as compared to the desired illustrated level of attenuation shown in FIG. 2) and consequently the V_sync signal detection is further delayed. The extent of the delay may well exceed the duration of half a line length, thus causing the V_sync signal detection to be delayed and to fall within the next TV line. The latter error cannot be tolerated in any system that requires a correct count of TV lines from the actual position of the vertical sync. In extreme cases, the distinction between the equalization and serration pulses is blurred to an extent that the V_sync signal is simply not detected which result in obvious undesired consequences.

Figure 4:
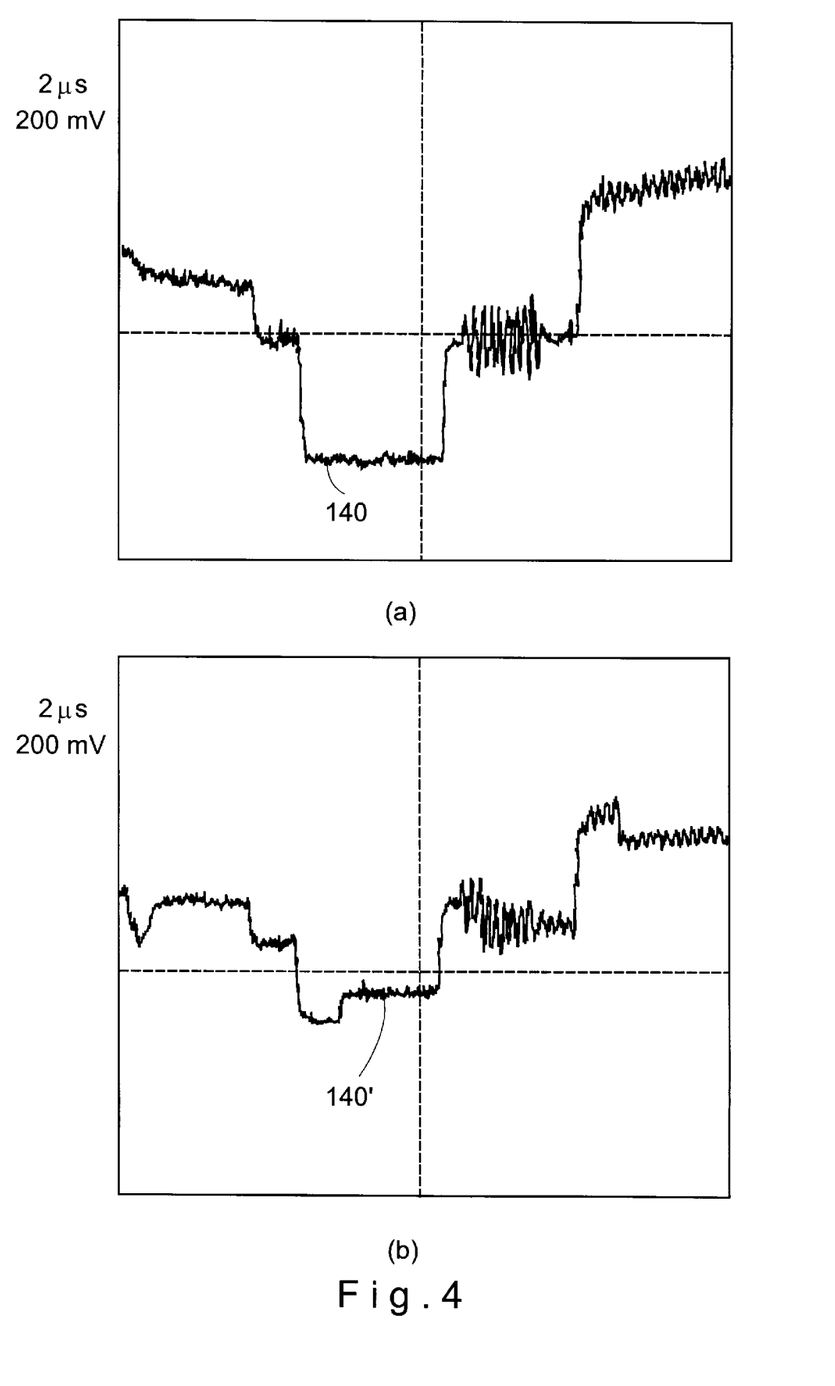
FIGS. 4a–b are two graph representations of respective ghost free and ghost contained horizontal synchronization waveforms.

FIGS. 4(a–b) demonstrate the effect of an exemplary strong negative ghost on the H_sync. The received signal which is the sum of the main video composite signal and a shifted negative ghost, is completely altered. Hence, the genuine H_sync (150 in FIG. 4(a)) is altered ((152') in FIG. 4(b) to the extent that it is no longer below the blank level making it very difficult or even impossible for detection by hitherto known threshold detection techniques. Other situations are also possible where the ghost of the H_sync is strong enough to cause an extra false detection of the H_sync.

SUMMARY OF THE INVENTION

It is an object of the present invention to provide for a digital processing technique capable of processing a composite video signal for synchronizing with an image field of the composite video signal, in a relatively reliable manner.

It is a specific object of the invention to provide for a technique of the kind specified usable also when ghosts interferences are present in the composite video signal.

It is yet another specific object of the invention to accomplish synchronization with a vertical synchronization signal in a field image at a high precision, i.e. at a time shift error that does not exceed a duration of displaying ½ TV line.

It is still another specific object of the invention to utilize the specified technique for indicating a "channel change" event.

The digital processing technique of the invention is distinguished from hitherto known technique not only in "what" it achieves but also in "how" it accomplishes the desired result.

Thus, if V_sync signal occurred in a given TV image field, at time $T_v$, then according to hitherto known technique, e.g. analog based integration techniques, a simultaneous indication on both the occurrence and timing of the sought signal is provided. Normally, the indicated timing deviates from the actual timing by a level of uncertainty $\Delta T_{err}$.

Conversely, the technique of the invention utilized a multi-stage detection approach. In a first stage only an indication of V_sync occurrence is provided and in a second stage, the V_sync timing at the specified level of precision is derived.

Moreover, the technique of the invention is versatile in the sense that it does not necessarily require to synchronize with the V_sync signal within an image field, and if desired the synchronization may be achieved vis-a-vis selected horizontal synchronization (H_sync) signal in the specified image field.

By one embodiment after having filtered and clamped the signal, the V_sync signal is detected in two stages. In the first step, an indication of V_sync occurrence is provided by detecting N out of S serration waveforms. Preferably, albeit not necessarily, the latter step is realized by measuring the duration that the waveform level drops below a pre-calculated threshold. Since serration waveforms are characterized by a low duty-cycle nature, then if the signal stays below the threshold for sufficient time interval, it indicates that a serration waveform has been detected. The remaining N−1 waveforms are detected in a similar manner. Thereafter, M waveforms (which as recalled are of high duty-cycle) are detected within the following equalization pulses by following the criterion that the level of each waveform should surpass the specified threshold, for a sufficient time interval.

It is now possible to determine the V_sync signal timing at a precision of ±½ line. It should be emphasized that after detecting N serration waveforms and M second equalization waveforms it is not obligatory to synchronize with the V_sync signal of the present image field, unless such a synchronization is essential for the application under consideration.

The technique of the invention may thus be utilized in wide range of applications, all as required and appropriate.

There is thus provided in accordance with the invention a composite video signal that contains an image field having a vertical synchronization (V_Sync) pulses; the V_sync pulses includes a first equalization pulses of $E_1$ waveforms followed by a serration pulses of S waveforms, $T_S$-long each, followed by a second equalization pulse of $E_2$ waveforms, $T_E$-long each; the transition from a last waveform of said $E_1$ waveforms to a first waveform of said S waveforms constitutes a vertical synchronization (V_sync) signal;

a method for determining a reference event occurring at a first time interval $\Delta T_1 \pm Er$ after said V_sync signal, wherein Er standing for time shift error, comprising:
 (i) filtering the composite video signal so as to obtain a filtered signal;
 (ii) clamping the filtered signal so as to obtain a clamped signal;
 (iii) detecting N (N≦S) waveforms in said serration pulses thereby indicating first event occurrence;
 (iv) in response to said first event occurrence, detecting M (M≦$E_2$) waveforms in said second equalization pulses, thereby determining said reference event occurrence;

such that said $\Delta T_1$ equals $M^*T_E + S^*T_S$.

As will be better understood from the description below, the detection step stipulated in said steps (iii) and (iv) may be realized in a synchronized or a synchronous manner.

For a synchronized case, the value N is limited to 4 for any PAL or SECAM standards, and to 5 for the NTSC standard, whereas for synchronized systems N may reach 5 for PAL/SECAM and 6 for NTSC. The value of N and M may be adjusted depending upon the desired confidence level of a V_sync signal detection. Thus, a large value for N reduces the likelihood of false first event detection but at the same time increases the likelihood of a first event miss. Conversely, a small value of N increases the likelihood of false detection but at the same time reduces the likelihood of first miss. Preferably, but not necessarily, M=1.

To sum up, M and N are set, as required and appropriate, depending upon the particular application.

There is thus provided a method of the kind specified wherein the detection in said serration pulses, as stipulated in said step (iii), is not synchronized with the waveforms of said serration pulses and wherein the detection in said second equalization pulses, as stipulated in said step (iv), is not synchronized with the waveforms of said second equalization pulses, whereby said time shift error does not exceed substantially $T_{HL}$, wherein $T_{HL}$ stands for the duration of displaying half a TV line.

Preferably, the decision criterion for detecting each one of said serration waveform is that the composite video signal level drops below a pre-calculated threshold, for a duration of more than Tms within any time window of e.g. half a TV line length. There is no requirement for the time window to be synchronized to any line or field start. In other words if the time window is synchronized with a line synchronization signal, this renders the search synchronous, otherwise the search is a-synchronous.

By one embodiment the value of Tms is calculated as the duration of half a TV line minus the duration of the serration waveform with a margin of confidence. A value of ¼ of a line length for Tms provides good results although different values may be selected for various applications all as required and appropriate. Thus, when the signal level is less than the V_th threshold for a duration of Tms, one serration waveform is detected. In a similar manner the remaining N−1 (for N>1) waveforms arc detected.

After having detected N waveforms, a "first event occurrence" is triggered.

In the successive stage, the presence of an equalization waveform is detected when the signal level surpasses the threshold for a duration of time of more than Tms within any time window of half a TV line length.

Of course, the Tms value need not necessarily be identical for both stages.

Having detected M equalization waveforms, the reference event is triggered at $\Delta T_1$ after the actual V_sync signal. $\Delta T_1$ essentially amounts for $T_S^*S + M^*T_E$.

By way of example, for NTSC standard S=6, E=5, S standing for the number of serration pulses and E standing for the number of equalization pulses and $T_S = T_E = $ ½ TV line duration; assuming N=3 and M=1, it readily arises that $\Delta T_1$ equals 3½ lines (i.e. the time equivalent to portraying 3½ lines on the TV monitor), all with time shift error of ±½ line. Put differently, the reference event occurred at time difference that is equivalent to 3–4 TV lines after the occurrence of the actual V_sync signal.

The technique of the invention thus provides for a method of the kind specified wherein said waveforms having each a blank level amplitude, constituting a high level, and a sync level amplitude, constituting a low level; the waveforms of said first equalization pulses and of said second equalization pulses are of high duty cycle; the waveforms of said serration pulses are of low duty cycle; said step (iii) including:

(a) determining an adaptive threshold having a threshold level below said blank level and above said sync level;

(b) detecting each one of said N waveforms, if it meets the following decision criterion:

the video signal level drops below said adoptive threshold for a duration of more than Tms within a time window such that Tms>$T_{LE}$ and Tms<$T_{LS}$ where $T_{LE}$ is the duration of the low level of an equalization waveform and $T_{LS}$ is the duration of the low level of the serration waveform.

After having executed the specified first and second stages, the desired level of synchronization precision may be enhanced by applying a third stage for synchronizing with an H_sync signal of predetermined line of the image field. This will enable to determine unequivocally the current line that is displayed on the TV monitor, which is an essential pre-requisite for applications such as ghost cancellation, Teletext and others.

By a preferred embodiment the H_sync event detection (which occurs at the start of each TV line) is triggered whenever the signal intensity drops below a fixed threshold. The exact timing of the H_sync detection is determined by the negative transition of the signal from above to below the threshold level.

There is thus provided a method of the kind specified further comprising the following step:

(v) in response to said reference event occurrence, detecting a horizontal sync signal occurring at a second time interval $\Delta T_2$ after said reference event occurrence, thereby synchronizing with a predetermined horizontal synchronization (H_sync) waveform in said image field; said $\Delta T_2$ equals for $(E_2-M)*T_E+(N-1)*\Delta T)$ where N stands for the full line number following the second equalization pulses, and $\Delta T$ stands for the $2*T_E$.

Reverting now to the embodiment that utilizes a threshold for realizing said steps (iii) and (iv), the threshold is preferably adaptively determined contingent upon the composite video signal level and form. By one embodiment, the value is automatically set to the minimum level that facilitates N consecutive detections of the serration pulses within an image field, is updated at any field, thus facilitating tracking of the varying signal conditions.

Preferably the composite signal is preprocessed by a digital low-pass filter (LPF) to reduce high frequency noise.

Thereafter the signal is clamped to a fixed level by minimum level clamping. The filtering and clamping steps may be nulled i.e. by a specific embodiment they are not necessarily applied.

As will be evident from the description below, after having synchronized with the synchronization signals/pulses (V_sync and/or H_sync), various applications such as predicting and tracking synchronization signals in successive image fields, indication of channel change and others may be exploited.

The present invention provides for a composite video signal that contains an image field having vertical synchronization (V_Sync) pulses; the V_sync pulses include first equalization pulses of $E_1$ waveforms followed by a serration pulses of S waveforms, $T_S$-long each, followed by a second equalization pulse of $E_2$ waveforms, $T_E$-long each; the transition from a last waveform of said $E_1$ waveforms to a first waveform of said S waveforms constitutes a vertical synchronization (V_sync) signal;

a system for determining a reference event occurring at a first time interval $\Delta T_1 \pm Er$ after said V_sync signal, wherein Er standing for time shift error, comprising:

(i) filter for filtering the composite video signal so as to obtain a filtered signal;

(ii) damper for clamping the filtered signal so as to obtain a clamped signal;

(iii) first detector for detecting N (N≦S) waveforms in said serration pulses thereby indicating first event occurrence;

(iv) second detector for detecting M (M≦$E_2$) waveforms in said second equalization pulses, thereby determining said reference event occurrence;

such that said $\Delta T_1$ equals $M*T_E+S*T_S$.

Still further, the invention provides for a composite video signal that contains an image field having a vertical synchronization (V_Sync) pulses; the V_sync pulses included first equalization pulses followed by serration pulses followed by second equalization pulses; the transition from the first equalization pulses to a first waveform of the serration pulses constitute a vertical synchronization signal;

a method for determining the occurrence of the V_sync signal at a delay of no more than half line, comprising:

(i) filtering the composite video signal so as to obtain a filtered signal;

(ii) clamping the filtered signal so as to obtain a clamped signal;

(iii) detecting at least one waveform in said serration signal;

(iv) in response to said step (iii) detecting at least one waveform in second equalization pulses thereby determining the occurrence of said V_sync signal at no more than half line error.

BRIEF DESCRIPTION OF THE DRAWINGS

For a better understanding, the invention will now be described by way of example only, with reference to the accompanying drawings, in which.

DESCRIPTION OF SPECIFIC EMBODIMENTS

Figure 5:
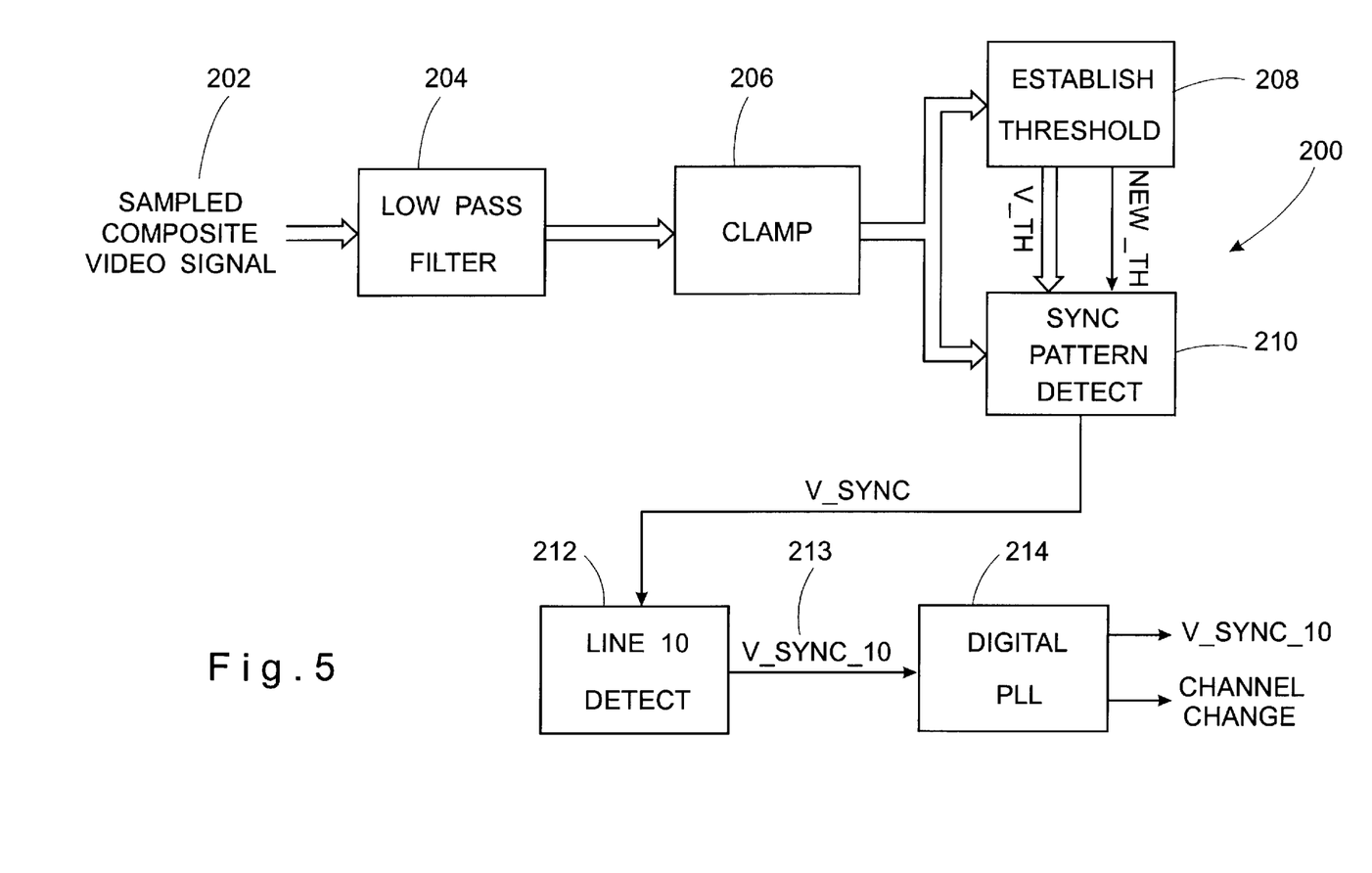
FIG. 5 shows a generalized block diagram of a system of the invention.

Attention is now directed to FIG. 5 showing a generalized block diagram of a system (200) according to the invention. As shown, the input data is a sampled composite video signal (202) which preferably should undergo low-pass filtering in module (204) as will be explained below. Signal (202) is applied after having been subject to A/D and to filter for reducing it below the nyquist frequency.

The digital low-pass filter module (204) is designed to retain only the spectrum of the information which contains the serration and equalization pulses. It should be noted that the low-pass filter module, having a known, per se, structure is not confined to any specific type and may be selected to be, e.g. with a cut-off frequency of the reciprocal of 2 times the width of the serration pulses, i.e.

$$1f = \frac{1}{(2 \times DT)},$$

Other designs are also applicable and may be selected e.g. depending on the desired degree of noise attenuation.

The known per se clamp unit (206) aims at removing superimposed low frequency noise. One possible approach for realizing the clamp unit is described below. Thus, the filtered signal is clamped to a constant value by continuously searching for a local minimum in the signal. A local minimum is found when W consecutive pixels have a smaller value than the previous minimum. If no local minimum is found within $W_{max}$ pixels, the previous minimum is increased. The minimum is subtracted from the signal and the result is added to a constant level. This is represented by the equations below.

Search for local minimum:

$$\text{if} \begin{pmatrix} y(j) < y\min \\ i - W < j \leq i \end{pmatrix} \quad (1)$$

$$y\min = y(i)$$

else if ymin unchanged for $W_{max}$ pixels ymin=ymin+incr where y is the filtered signal and ymin is the local minimum. Clamping to a constant level:

$$yc(i)=K+y(i)-y\min \quad (2)$$

where yc is the signal clamped to the constant level.

As is evident from the above equation, ymin is rendered invariable when the signal y(j) exceeds ymin for at least consecutive W-length duration (W standing for a number of pixels) whilst dropping at least once below the ymin value over the duration of $W_{max}$ length pixels. Obviously $W_{max}$ is always greater than W, e.g. 100 pixels versus 10 pixels. Having stabilized ymin, the clamped signal (yc)(i) is calculated as stipulated in Equation 2 above. Those versed in the art will readily appreciate that W and $W_{max}$ may be adjusted as required and appropriated depending on the particular application.

Before turning to the description of first event detection, there follows a brief description of a non limiting example for establishing a threshold (269) that will be used during the first event detection. Thus, for determining the threshold V_thl a first stage of determining a minimum threshold V_th(t) commences. V_th(t) is set to an initial value, e.g. 0, and is raised if N consecutive serration waveforms indications were not found within one TV field. It is reduced if N consecutive indications are found. This up-down correction of the minimum threshold constitutes a feedback tracking process of the threshold level. Having determined the V_th(t) minimum threshold the sought threshold V_thl (t) is determined in compliance with the following algorithmic expression $$V\_thl(t)=V\_th(t)+c \quad (3)$$

The value of the constant c must be larger than the correction steps of the adaptive tracking process specified before in order to make sure that the V_thl level will not drop below the required value which guarantees the _sync event detection. It should be noted that by virtue of the noisy nature of the video signal, it is not sufficient to determine V_th(t) only once and to use it for the succeeding image field. Therefore, V_th(t) should, preferably be determined in each field and for each respective V_th(t), a corresponding V_thl(t) is determined. In compliance with algorithmic expression (3), one could therefore refer to the determination of V_th and V_thl as two parallel processes executed preferably (although not necessarily) during each field.

Having obtained a clamped signal, it is now required to commence a first stage for detecting a first event (detection of N serration waveforms) followed by a second stage for detecting a reference event (detection of M second equalization waveforms) using to this end the V_thl threshold. The procedure for realizing the specified stages will be described with reference also to FIG. 6. For a better understanding and by way of example only, after having executed the first and second stages a synchronization with the V_sync signal (250) at a precision of ½ TV line is accomplished. The hereinbelow example proceeds to a third stage for detecting a V_sync_10 signal (252), which in the NTSC standard stands for the H_sync signal of the $10^{th}$, TV line.

Figure 6:
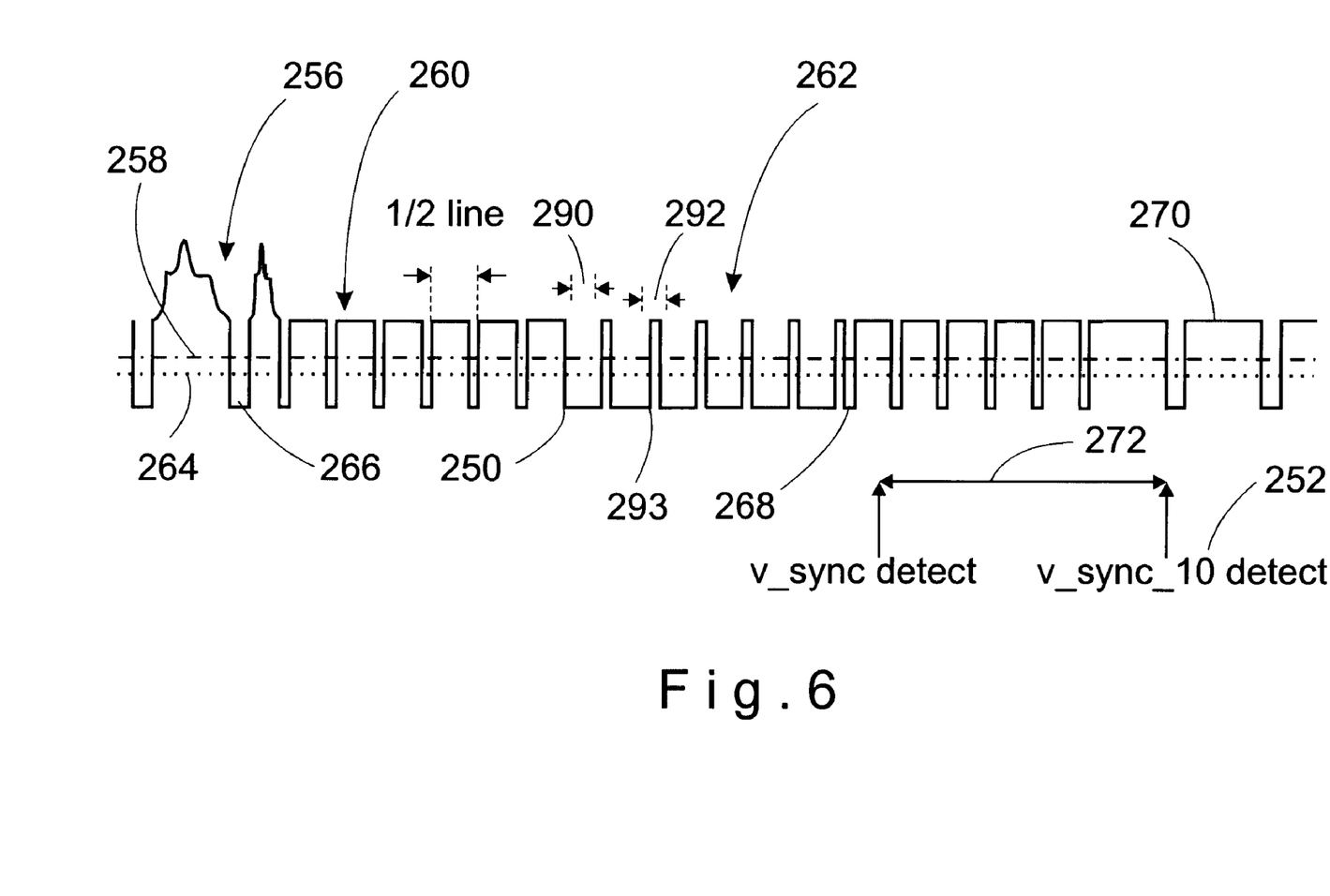
FIG. 6 is a graph representation of realizing a three-stage procedure, according to one embodiment of the invention.

The accurate detection of V_sync is important, inter alia, in order to timely forward an image field to the TV monitor whereas the V_sync_10 is important since it signifies the first H_sync signal which identifies a regular line. As is shown in FIG. 6, the composite video signal consists of video data constituent designated collectively (256) that surpasses the blank level (258). The video data (256) is followed by a first equalization pulses (260) such that the time period of each waveform is equivalent to the time interval required to display half a line on a TV monitor. As shown, each equalization waveform has a high blank level amplitude and a low sync level, amplitude.

Each of the waveforms in the equalization pulses stays in the maximum value for about 93% of the time as compared to only 7% in the sync level. Conversely, the succeeding series of serration waveforms designated collectively as serration pulses (262) are characterized in that each waveform stays at the sync level for about 93% and at the blank level for only about 7%. Since, as specified before, each waveform extends for a half IV line, the 6 waveforms that constitute the serration pulses correspond to 3 lines (according to the NTSC standard) whilst in other standards such as PAL/SECAM the serration pulses includes only 5 waveforms (corresponding to 2½ lines).

Generally speaking, the detection procedure of the invention includes a first stage of searching for N serration waveforms. To this end, the signals are processed to determine whether the waveform level under question drops below a threshold. As will be explained in greater detail below, the threshold level (264) is set to be between the blank level (258) and the sync level (266). A serration waveform is deemed to be encountered if the value of the signal stays below the threshold for at least Tms. Tms is taken to be larger than the sync level duration of a typical equalization waveform (e.g. 258) whilst being shorter than the sync level of a typical serration waveform. By way of non limiting example, Tms=¼ line meets the specified condition. Detection of N (preferably consecutive) serration waveforms where $1 \leq N \leq 5$ (for NTSC standard), brings about "first event detection". In this connection, it should be noted that N may be set depending on whether false detection or miss-detections are to be avoided. In other words, in the case that N=1, the probability of miss-detection is at the minimum since there are very good prospects for detecting at least one out of the existing six serration waveforms (NTSC standard). At the same time, N=1 increases the likelihood of false detection which may occur under bad signal reception and high interference level signal. Conversely, when N is set to be the maximal number of pulses (6 in NTSC or 5 in PAL/SECAM), the probability of false detection is of course decreased, but at the same time, the likelihood of missing the detection of all the 6 waveforms from among the available 6 waveforms of the serration pulses increases. It is accordingly appreciated that the optimal value of N is set according to the particular application all as required and appropriate.

If the serration line indication count (N) is set to less than the maximum possible (5 for NTSC or 4 for PAL/SECAM), then more than one "success" may be indicated within a single serration phase sequence. Thus, by way of example, if N is set to 1 then, theoretically, 5 first event indications may occur, each for a distinct waveform. To this end, after N consecutive serration waveforms have been encountered (the specified "first" event) the second stage of detecting M second equalization waveform commences. As is clearly evident from FIG. 6, the duration of time that typical serration waveform stays below the threshold is 93% whereas the corresponding period in a equalization waveform (268) is only 3.5%. The latter observation suggests a criterion for detecting the occurrence of a first equalization waveform which signifies reference event detection. Thus, one possible criterion being counting the number of pixels that the signal surpasses the threshold (264) and only a waveform that has a sufficient number of pixels of this kind is deemed a second equalization waveform. For M>1, the specified procedure continues until M waveforms are encountered, triggering the reference event occurrence.

As specified, the search may be a-synchronous or synchronous. In the latter, the search window is synchronized to a V_sync waveform as exemplified e.g. by window (290) whose left margin essentially coincides with the commencement of the first waveform in the serration pulses. Conversely, in the a-synchronous case, the specified constraints do not apply and the search window may appear at any place, e.g. (292), which as shown extends over two consecutive waveforms. The criterion for detecting a waveform may be the same for the synchronous and a-synchronous case. Thus in window (290) (the synchronized case) if the signal stays below the threshold (264) for more than Tms, a waveform detection occurs. In the a-synonymous case, despite the fact that the window (292) is placed over two waveform portions, the signal stays predominantly, (except for the short period (293)), below the threshold for a time period that exceeds Tms and accordingly a waveform detection is indicated.

In the a-synchronous case, due to the fact that the window may extend over two waveforms, the maximum allowed value for N is S-1, whereas for the synonymous case N may equal S (S being the number of waveforms in the serration pulses).

Having described a realization of a typical first and second stage, there follows a description of a third stage for detecting V-sync-10 signal, or, in other words it is now required to identify the first regular TV line which is at line 10 (NTSC) or line 6 (PAL/SECAM) of the composite video signal. This signal is designated at V_sync_10 (252) having a waveform (270).

Assuming that only one equalization waveform triggered the reference event occurrence, (i.e. M=1), the V_Sync_10 waveform is encountered 5 or 6 (NTSC) or 4 or 5 (PAL/SECAM) waveform delay after the reference event, i.e. 2.5 or 3 TV lines, respectively. Since, as recalled, a synchronization to the equalization waveform has been accomplished (within a ±¼ line margin), what remains to be done is to wait for a time interval that corresponds to 2.5 TV lines (5 equalization waveforms) in NTSC or 2 TV lines (4 equalization waveforms) in PAL/SECAM. This time interval is indicated by reference numeral (272) in FIG. 7 and upon the elapse thereof the sought V_sync_10 event is encountered.

What has been accomplished up till now is the accurate detection of the V_sync_10 signal. The accurate detection of the V_sync_10 waveform facilitating precise synchronization of the V_sync signal of the next image field (which is expected to take place after a time interval that corresponds to a complete image field minus 6 lines. As is well known, line no. 4 is the V-sync line). The accomplished synchronization with the next V_sync_10 signal facilitates correct display of successive image on the TV monitor. Moreover, it enables to synchronize with any desired line in the field image (i.e. with an H_sync signal other than the V_sync_10), for use in applications such as a video text, teletext. The latter applications normally require reading and writing information from and to a given line on the monitor.

The above threshold establishment procedure is performed in block (208) and the N serration and M equalization waveform detection is realized in block (210). The V_sync_10 detection procedure is realized in block designated generally as (212) all in FIG. 5.

Insofar as interlaced monitors are concerned, the procedure of applying the three stages is similar with respect to the odd and even field except for the fact that the delay interval at (272) is longer for the even field due to the fact that the second equalization pulse consists of an additional waveform as compared to the corresponding second equalization pulses in the odd field.

Synchronizing with an H_sync signal of specific line in a field image is far more simplified as compared to the corresponding procedure for detecting V_sync event and concerns mainly processing the clamped signal for detecting of a negative transition of the composite video signal from above to below a constant threshold. The procedure of determining the threshold (for detecting H_sync signal) is also simplified as compared to the proposed one in the V_sync detection event since the H_sync signal has a minimum amplitude as compared to any other signals (except for the serration line pulses which can be easily discerned from the H_sync signal). The clamping procedure always brings the bottom of the sync pulse to a fixed level and a fixed threshold guarantees H_sync detection.

As specified before, after having detected the reference event, it is possible to synchronize with the vertical and/or horizontal synchronization signals of the specified image field. Once synchronization is accomplished, various known per se applications may be exploited such as predicting and simulating V_sync signal, and indication of a channel change event.

Figure 7:
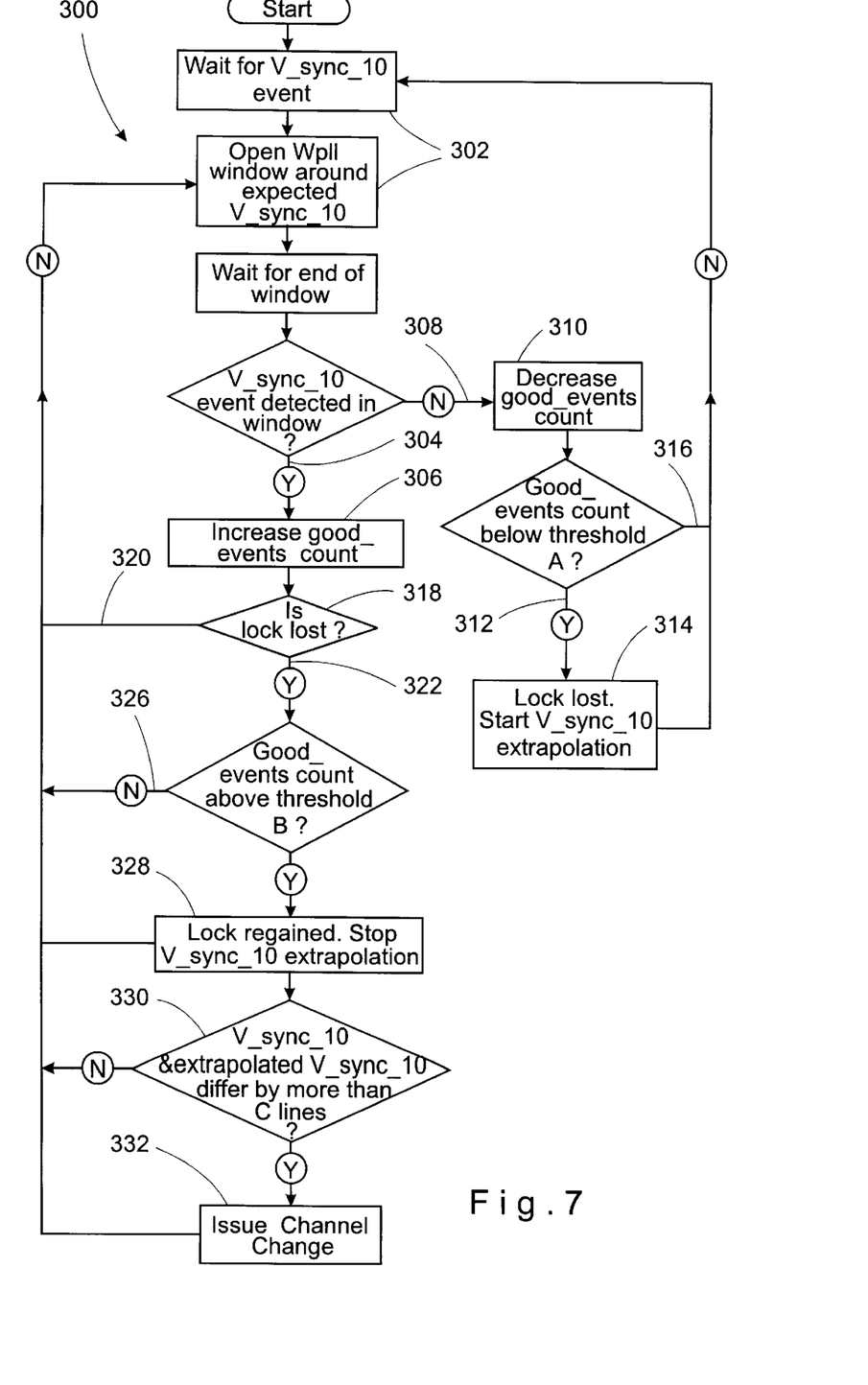
FIG. 7 is a block diagram for realizing synchronization lock and channel change indications, according to one embodiment of the invention.

These applications, generally encompassed by module (214) in FIG. 5, will be expounded upon with reference also to FIG. 7 (300). As shown in FIG. 5, by this specific embodiment the V_sync_10 signal (213) was also detected, thereby fully synchronizing with the $10^{th}$ line of the specified field image.

Following synchronization to the first regular TV line, i.e. V_sync_10, the indication of V_sync_10 occurrence along with the timing thereof is fed to digital PLL module (standing for phase lock loop) (214). Now, the timing of next V_Sync_10 signal in successive image field is predicted, i.e. if $T_{v\_10}$ is the timing of the present V_Sync_10 signal then $T_{v\_10} + T_F$ is the predicted timing of the next V_Sync_10 signal, where $T_F$ stands for the time interval for displaying a whole image field. Having obtained predicted timing of the next V_Sync_10 signal, a $W_{PLL}$ length window (302) is opened around the predicted occurrence of V_Sync_10 signal, i.e. essentially at timing $T_{v\_10} + T_F$. The width of the search window is $W_{PLL}$ pixels, where $W_{PLL}$ is smaller than the time equivalent of one TV line. The precise location of the window vis-a-vis the specified predicted timing (e.g. whether the specified timing is aligned to the middle or left or right boundary of the window, etc.) may also be determined, all as required and appropriate.

If the V_Sync_10 signal is encountered within the search window (304) in the next field image, a so called "good_event" counter is incremented (306). Optionally when the next V_Sync$_{10}$ signal is encountered at time T within the search window, T is compared to the predicted $T_{v\_10} + T_F$ time and in case of discrepancy ($\Delta T_d$) the latter is used for adjusting the next prediction of the V_Sync_10 signal.

If, on the other hand, the next V_Sync_10 signal is not encountered in the search window (308), then the specified "good_event" counter is decrement (310) and when the value of the counter drops below a predetermined threshold A (312), a signal indicating "lock lost" state is invoked (314). The "lock lost" state commences a "search V_sync-10 procedure" in order to resume the issuance of V_sync_10 signal. The search procedure may be realized, e.g. by executing the specified first, second and third stages of the invention. If the counter's value equals or larger than the specified threshold (316), the timing of the next V_sync_10 event is again predicted and steps (302) are repeated.

If desired, whenever the specified V_Sync_10 signal is not encountered in the boundaries of the search window, the V_Sync_10 signal may be nevertheless simulated immediately upon the elapse of the waiting period, thereby facilitating the regular operation of the TV circuitry.

Reverting now to block (306), the lock lost state is tested (318), and in case of negative reply (320) control is again transferred to step (302). If, on the other hand, lost lock state is encountered (322), then the value of the "good event counter" is ascertained (324). If the latter does not exceed a predetermined value (threshold B), then control is again transferred to step (302). If the value of the counter surpasses the specified threshold (328), it indicates that lock is resumed for sufficient time which can be regarded as stable lock resumption, and not a temporary lock state.

It is now required to ascertain whether there is a time shift between the previous V_sync_10 timing (before lock has been lost, hereinafter $T_1$), and the new timing after lock is resumed (hereinafter $T_2$). Of course no time shift is reported if the time interval between the $T_1$ and $T_2$ events essentially equals to integer multiplication of a field image time interval $T_F$. In other words, if $T_2 - T_1 = i*T_F + K$ ($K \approx 0$, i integer), no time shift is reported.

If, however, $0 < K < T_F$, then the re-locked V_sync is shifted from the previously acquired V_sync signal by a time shift that is equivalent to i TV lines. One possible criterion for determining channel change is that i>C.

In this connection it should be noted that TV broadcast channels are independent one with respect to the other and are normally not synchronized one with respect to the other. Accordingly, detection of the V_sync_10 signal at time difference of more than C lines indicates, with high level of confidence, that channel change has been occurred.

The various parameters such as the counter values, the respective threshold values A and B and the number of lines C may be adjusted, all as required and appropriate, depending upon the particular application.

Whilst the description of FIG. 7 focused on the V_sync_10 signal, it likewise applies to the V_sync signal and/or other H_sync signals, (other than the V_sync_10 signal), all as required and appropriate. Those versed in the art will readily appreciate that the signal prediction and channel change indications, are by no means, bound to the specific example that is described with reference to FIG. 7.

Channel change indication, as described above, may be utilized e.g. for ghost cancellation application. Thus, as is well known, when channel change occurs, the display on the screen is disrupted for a duration of up to a few seconds.

It should be noted that duly synchronizing with the V_sync and H_sync signals is of importance for various ghost cancellation applications where correct counting of TV lines is required to locate the line in which GCR (standing for ghost cancellation reference) signal pulses is inserted. It may also be beneficial for other applications in which correct counting of TV lines is required, when the original received composite video signal is distorted on account of noise, ghosts and other interferences.

In the claim which follow, alphabetic characters used to designate claim steps are provided for convenience of description only, and do not necessarily imply any particular order of performing the steps.

The present invention has been described with a certain degree of particularity but it should be understood that various modifications and alteration may be made without departing from the scope or spirit of the invention as defined by the following claims:

We claim:

1. In a composite video signal that contains an image field having a vertical synchronization (V_Sync) pulses; the V_sync pulses included first equalization pulses of $E_1$ waveforms followed by a serration pulses of S waveforms, $T_S$-long each, followed by a second equalization pulse of $E_2$ waveforms, $T_E$-long each; the transition from a last waveform of said $E_1$ waveforms to a first waveform of said S waveforms constitutes a vertical synchronization (V_sync) signal;

a method for determining a reference event occurring at a first time interval $\Delta T_1 \pm Er$ after said V_sync signal, wherein Er standing for time shift error, comprising:
(i) filtering the composite video signal so as to obtain a filtered signal;
(ii) clamping the filtered signal so as to obtain a clamped signal;
(iii) detecting N (N≦S) waveforms in said serration pulses thereby indicating first event occurrence;
(iv) in response to said first event occurrence, detecting M (M≦$E_2$) waveforms in said second equalization pulses, thereby determining said reference event occurrence;

such that said $\Delta T_1$ equals $M*T_E + S*T_S$.

2. The method of claim 1 wherein the detection in said serration pulses, as stipulated in said step (iii), is not synchronized with the waveforms of said serration pulses and wherein the detection in said second equalization pulses, as stipulated in said step (iv), is not synchronized with the waveforms of said second equalization pulses, whereby said time shift error does not exceed substantially $T_{HL}$, wherein $T_{HL}$ stands for the duration of displaying half a TV line.

3. The method of claim 1, further comprising the following step:

(v) in response to said reference event occurrence, detecting a horizontal sync signal occurring at a second time interval $\Delta T_2$ after said reference event occurrence, thereby synchronizing with a predetermined horizontal synchronization (H_sync) waveform in said image field; said $\Delta T_2$ equals for $(E_2-M)*T_E+(N-1)*\Delta T$ where N stands for the full line number following the second equalization pulses, and $\Delta T$ stands for the $2*T_E$.

4. The method of claim 1, wherein the detection in said serration pulses, as stipulated in said step (iii), is synchronized with the waveforms of said serration pulses and wherein the detection in said second equalization pulses, as stipulated in said step (iv), is synchronized with the waveforms of said second equalization pulses, whereby said time shift error is essentially zero.

5. A method according to claim 1, wherein said waveforms having each a blank level amplitude, constituting a high level, and a sync level amplitude, constituting a low level; the waveforms of said first equalization pulses and of said second equalization pulses are of high duty cycle; the waveforms of said serration pulses are of low duty cycle; said step (iii) including:

(a) determining an adaptive threshold having a threshold level below said blank level and above said sync level;

(b) detecting each one of said N waveforms, if it meets the following decision criterion:
   the video signal level drops below said adoptive threshold for a duration of more than Tms within a time window such that Tms>$T_{LE}$ and Tms<$T_{LS}$ where $T_{LE}$ is the duration of the low level of an equalization waveform and $T_{LS}$ is the duration of the low level of the serration waveform.

6. A method according to claim 1, wherein said composite video signal complies with the NTSC standard.

7. A method according to claim 1, wherein said composite video signal complies with the PAL/SECAM standard.

8. A method according to claim 1, further comprising:
predicting the timing occurrence of the V_sync signal of successive field images.

9. A method according to claim 8, in which if said signal does not appear around said predicted time, a signal search procedure commences.

10. A method according to claim 9, in which responsive to re-locking of said signal, and if the locked signal appears in $\Delta T$ larger than constant as compared to said predicted time, a channel change signal is invoked.

11. The method of claim 10, wherein said channel change signal is utilized by ghost cancellation application.

12. In a composite video signal that contains an image field having vertical synchronization (V_Sync) pulses; the V_sync pulses include first equalization pulses of $E_1$ waveforms followed by a serration pulses of S waveforms, $T_S$-long each, followed by a second equalization pulse of $E_2$ waveforms, $T_E$-long each; the transition from a last waveform of said $E_1$ waveforms to a first waveform of said S waveforms constitutes a vertical synchronization (V_sync) signal;

a system for determining a reference event occurring at a first time interval $\Delta T_1 \pm Er$ after said V_sync signal, wherein Er standing for time shift error, comprising:

(i) filter for filtering the composite video signal so as to obtain a filtered signal;

(ii) damper for clamping the filtered signal so as to obtain a clamped signal;

(iii) first detector for detecting N (N≦S) waveforms in said serration pulses thereby indicating first event occurrence;

(iv) second detector for detecting M (M≦$E_2$) waveforms in said second equalization pulses, thereby determining said reference event occurrence;

such that said $\Delta T_1$ equals $M*T_E+S*T_S$.

13. The system of claim 12, wherein the detection in said serration pulses, is not synchronized with the waveforms of said serration pulses and wherein the detection in said second equalization pulses is not synchronized with the waveforms of said second equalization pulses, whereby said time shift error does not exceed substantially $T_{HL}$, wherein $T_{HL}$ stands for the duration of displaying half a TV line.

14. The system of claim 12, further comprising:

detector for detecting a horizontal sync signal occurring at a second time interval $\Delta T_2$ after said reference event occurrence, thereby synchronizing with a predetermined horizontal synchronization (H_sync) waveform in said image field; said $\Delta T_2$ equals for $(E_2-M)*T_E+(N-1)*\Delta T$ where N stands for the fill line number following the second equalization pulses, and $\Delta T$ stands for the $2*T_E$.

15. The system of claim 12, wherein the detection in said serration pulses, is synchronized with the waveforms of said serration pulses and wherein the detection in said second equalization pulses, is synchronized with the waveforms of said second equalization pulses, whereby said time shift error is essentially zero.

16. A system according to claim 12, wherein said waveforms having each a blank level amplitude, constituting a high level, and a sync level amplitude, constituting a low level; the waveforms of said first equalization pulses and of said second equalization pulses are of high duty cycle; the waveforms of said serration pulses are of low duty cycle; the system further comprising:

(a) threshold device for determining an adaptive threshold having a threshold level below said blank level and above said sync level;

(b) detector for detecting each one of said N waveforms, if it meets the following decision criterion:
   the video signal level drops below said adaptive threshold for a duration of more than Tms within a time window such that Tms>$T_{LE}$ and Tms<$T_{LS}$ where $T_{LE}$ is the duration of the low level of an equalization waveform and $T_{LS}$ is the duration of the low level of the serration waveform.

17. A system according to claim 12, wherein said composite video signal complies with the NTSC standard.

18. A system according to claim 12, wherein said composite video signal complies with the PAL/SECAM standard.

19. A system according to claim 12, further comprising:
predictor for predicting the timing occurrence of the V_sync signal of successive field images.

20. A system according to claim 19, in which if said signal does not appear around said predicted time, a signal search procedure commences.

21. A system according to claim 19, in which responsive to re-locking of said signal, and if the locked signal appears in $\Delta T$ larger than constant as compared to said predicted time, a channel change signal is invoked.

22. The system of claim 21, wherein said channel change signal is utilized by ghost cancellation application.

23. In a composite video signal that contains an image field having a vertical synchronization (V_Sync) pulses; the V_sync pulses included first equalization pulses followed by serration pulses followed by second equalization pulses; the transition from the first equalization pulses to a first waveform of the serration pulses constitute a vertical synchronization signal;

a method for determining the occurrence of the V_sync signal at a delay of no more than half line, comprising:

(i) filtering the composite video signal so as to obtain a filtered signal;

(ii) clamping the filtered signal so as to obtain a clamped signal;

(iii) detecting at least one waveform in said serration signal;

(iv) in response to said step (iii) detecting at least one waveform in second equalization pulses thereby determining the occurrence of said V_sync signal at no more than half line error.

\* \* \* \* \*